United States Patent
Bai et al.

(10) Patent No.: US 12,028,934 B2
(45) Date of Patent: *Jul. 2, 2024

(54) METHOD AND TERMINAL FOR KEEPING SUBSCRIBER IDENTITY MODULE CARD IN STANDBY STATE

(71) Applicant: Huawei Technologies Co., Ltd., Shenzhen (CN)

(72) Inventors: Zhidong Bai, Shenzhen (CN); Chunxi Zhu, Shenzhen (CN); Chenghui Peng, Shanghai (CN); Yuqing Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 391 days.

This patent is subject to a terminal disclaimer.

(21) Appl. No.: 17/490,159

(22) Filed: Sep. 30, 2021

(65) Prior Publication Data

US 2022/0104007 A1 Mar. 31, 2022

Related U.S. Application Data

(63) Continuation of application No. 16/697,786, filed on Nov. 27, 2019, now Pat. No. 11,153,746, which is a
(Continued)

(30) Foreign Application Priority Data

Sep. 27, 2012 (CN) .......................... 201210374444.2

(51) Int. Cl.
*H04W 8/22* (2009.01)
*H04W 8/18* (2009.01)
(Continued)

(52) U.S. Cl.
CPC ............. *H04W 8/22* (2013.01); *H04W 8/183* (2013.01); *H04W 12/06* (2013.01); *H04W 12/45* (2021.01)

(58) Field of Classification Search
CPC ....... H04W 24/02; H04W 8/18; H04W 8/183; H04W 4/60; H04W 12/35; H04W 4/50;
(Continued)

(56) References Cited

U.S. PATENT DOCUMENTS

| 6,745,048 B2 | 6/2004 | Vargas et al. |
| 8,200,736 B2 | 6/2012 | Shi et al. |

(Continued)

FOREIGN PATENT DOCUMENTS

| CN | 1901450 A | 1/2007 |
| CN | 101217747 A | 7/2008 |

(Continued)

OTHER PUBLICATIONS

Arkko, J., et al., "Extensible Authentication Protocol Method for 3rd Generation Authentication and Key Agreement (EAP-AKA)," XP055244368, RFC 4187, Jan. 2006, 79 pages.
(Continued)

*Primary Examiner* — David Q Nguyen
(74) *Attorney, Agent, or Firm* — Conley Rose, P.C.

(57) ABSTRACT

A method and a terminal device for keeping a subscriber identity module card in a standby state, including receiving an enabling request to enable dual standby of a first subscriber identity module (SIM) card and a second SIM card in the terminal device, wherein the first SIM card is software-implemented, and wherein the second SIM card is hardware-implemented, accessing a first network for the first SIM card by invoking a third-party interface of an operating system of the terminal and using a data file associated with
(Continued)

the first SIM card, and implementing a dual standby of the first SIM card and the second SIM card.

21 Claims, 6 Drawing Sheets

Related U.S. Application Data continuation of application No. 15/985,254, filed on May 21, 2018, now Pat. No. 10,511,959, which is a continuation of application No. 15/591,819, filed on May 10, 2017, now Pat. No. 10,003,962, which is a continuation of application No. 14/671,018, filed on Mar. 27, 2015, now Pat. No. 9,674,696, which is a continuation of application No. PCT/CN2013/076636, filed on Jun. 3, 2013.

(51) Int. Cl.
   *H04W 12/06* (2021.01)
   *H04W 12/45* (2021.01)
(58) Field of Classification Search
   CPC ....... H04W 12/06; H04W 8/22; H04W 12/04; H04L 63/0853
   USPC .............................................. 455/411, 552.1
   See application file for complete search history.

(56) References Cited

U.S. PATENT DOCUMENTS

| | | | |
|---|---|---|---|
| 8,295,807 | B2 | 10/2012 | Neumann et al. |
| 9,083,581 | B1 | 7/2015 | Addepalli et al. |
| 9,906,254 | B2 | 2/2018 | Zhao et al. |
| 2002/0184407 | A1 | 12/2002 | Shell et al. |
| 2004/0176134 | A1 | 9/2004 | Goldthwaite et al. |
| 2005/0176466 | A1 | 8/2005 | Verloop et al. |
| 2006/0046710 | A1 | 3/2006 | Lohlein et al. |
| 2008/0300008 | A1* | 12/2008 | Kim .................. H04M 1/72469 455/552.1 |
| 2008/0318621 | A1* | 12/2008 | Fan ....................... H04W 12/08 455/552.1 |
| 2009/0069048 | A1* | 3/2009 | Yang .................... G06K 7/0069 455/558 |
| 2009/0156254 | A1 | 6/2009 | Montes |
| 2010/0151823 | A1 | 6/2010 | Dagorn et al. |
| 2010/0210304 | A1 | 8/2010 | Huslak |
| 2010/0248690 | A1 | 9/2010 | Biggs et al. |
| 2010/0311391 | A1 | 12/2010 | Siu et al. |
| 2011/0003618 | A1 | 1/2011 | Tang |
| 2011/0028135 | A1 | 2/2011 | Srinivasan |
| 2011/0059738 | A1 | 3/2011 | Waller |
| 2011/0086670 | A1 | 4/2011 | Shin |
| 2011/0269456 | A1 | 11/2011 | Krishnaswamy et al. |
| 2012/0108294 | A1 | 5/2012 | Kaul |
| 2012/0129513 | A1 | 5/2012 | Van Der Laak |
| 2012/0172011 | A1 | 7/2012 | Gupta et al. |
| 2012/0231802 | A1 | 9/2012 | Ngai |
| 2013/0005300 | A1* | 1/2013 | Wang .................. H04M 17/206 455/407 |
| 2013/0005394 | A1 | 1/2013 | Geary et al. |
| 2013/0065570 | A1 | 3/2013 | Jung et al. |
| 2013/0065644 | A1 | 3/2013 | Bishop et al. |
| 2013/0203385 | A1* | 8/2013 | Wei ....................... H04W 88/06 455/411 |
| 2013/0231087 | A1 | 9/2013 | O'Leary |
| 2013/0252584 | A1 | 9/2013 | Cuadrat et al. |
| 2013/0310035 | A1 | 11/2013 | Gouriou et al. |
| 2013/0310108 | A1 | 11/2013 | Altman |
| 2013/0329639 | A1 | 12/2013 | Wietfeldt et al. |
| 2014/0120859 | A1 | 5/2014 | Ekici et al. |
| 2014/0256283 | A1 | 9/2014 | Lin et al. |
| 2014/0274006 | A1 | 9/2014 | Mutya et al. |
| 2014/0342715 | A1* | 11/2014 | Gu .......................... H04W 8/22 455/418 |
| 2015/0017982 | A1 | 1/2015 | Klatt |
| 2015/0126153 | A1 | 5/2015 | Spitz et al. |
| 2015/0137943 | A1 | 5/2015 | Nagel et al. |
| 2015/0201325 | A1 | 7/2015 | Bai et al. |

FOREIGN PATENT DOCUMENTS

| | | |
|---|---|---|
| CN | 101222712 A | 7/2008 |
| CN | 101222723 A | 7/2008 |
| CN | 101350988 A | 1/2009 |
| CN | 101553055 A | 10/2009 |
| CN | 101478840 B | 9/2010 |
| CN | 101990319 A | 3/2011 |
| CN | 102065161 A | 5/2011 |
| CN | 102932531 A | 2/2013 |
| EP | 2437528 A1 | 4/2012 |
| IN | 202798702 U | 3/2013 |
| RU | 2010130987 A | 2/2012 |
| RU | 2482623 C2 | 5/2013 |
| WO | 2012058099 A1 | 5/2012 |
| WO | 2012072463 A1 | 6/2012 |
| WO | 2012080377 A1 | 6/2012 |

OTHER PUBLICATIONS

Richarme, "The Virtual SIM—A Feasibility Study—," Master's Thesis, Copenhagen, Apr. 21, 2008, 158 pages.

* cited by examiner

METHOD AND TERMINAL FOR KEEPING SUBSCRIBER IDENTITY MODULE CARD IN STANDBY STATE

CROSS-REFERENCE TO RELATED APPLICATIONS

This application is a continuation of U.S. patent application Ser. No. 16/697,786, filed on Nov. 27, 2019, which is a continuation of U.S. patent application Ser. No. 15/985,254, filed on May 21, 2018, now U.S. Pat. No. 10,511,959, which is a continuation of U.S. patent application Ser. No. 15/591,819, filed on May 10, 2017, now U.S. Pat. No. 10,003,962, which a continuation of U.S. patent application Ser. No. 14/671,018, filed on Mar. 27, 2015, now U.S. Pat. No. 9,674,696, which is a continuation of International Application No. PCT/CN2013/076636, filed on Jun. 3, 2013, which claims priority to Chinese Patent Application No. 201210374444.2, filed on Sep. 27, 2012. All of the aforementioned patent applications are hereby incorporated by reference in their entireties.

TECHNICAL FIELD

The present disclosure relates to the field of communications technologies, and in particular, to a method and a terminal device for keeping a subscriber identity module card in a standby state.

BACKGROUND

A subscriber identity module (SIM) card is also called a smart card or a subscriber identification card. The SIM card stores content such as information about a digital mobile phone subscriber, an encrypted key, and a telephone directory of the subscriber in a computer chip. The SIM card is a chip having a microprocessor and has five modules inside a central processing unit (CPU), a program storage, a work storage, a data storage, and a serial communications unit, and the five modules are integrated in an integrated circuit. The SIM card mainly has the following functions.

(1) Storage of Subscriber-Related Data.

Data stored in the SIM card may be classified into four types. A first type is fixedly stored data, and this type of data is written by a SIM card center before a mobile equipment (ME) is sold, and includes an international mobile subscriber identification number (IMSI), an authentication key (Ki), and the like, a second type is temporarily stored network-related data, such as a location area identification (LAI), a temporary mobile subscriber identity (TMSI), and a code for a public telephone network forbidden to be accessed, a third type is a related service code, such as a personal identification number (PIN), a pin unblocking key (PUK), and a charging rate, and a fourth type is a phone directory, which includes a phone number entered by a mobile phone subscriber at any time.

(2) Subscriber PIN Operation and Management.

The SIM card is protected through a PIN, and the PIN is a personal password with four to eight digits. A SIM card can be enabled only when a subscriber enters a correct PIN, so that a mobile terminal can access the SIM card, and the subscriber can access a network and make a call only after authentication of the PIN succeeds.

(3) Subscriber Identity Authentication.

Subscriber identity authentication is implemented between a network and the SIM card. When the authentication begins, the network generates a 128-bit random number (Rand) and transmits the Rand through a radio control channel to a mobile station, and the SIM card computes, according to the key Ki and an algorithm A3 in the card, a signed response (SRES) to the received Rand, and then sends the result to a network end. The network end finds out a key Ki of the subscriber in an authentication center, computes an SRES using the same Rand and algorithm A3, and compares the SRES with the received SRES. If consistent, the authentication succeeds.

(4) Encryption Algorithms and Keys in the SIM Card.

Most sensitive data in the SIM card includes encryption algorithms A3 and A8 and keys Ki, PIN, PUK, and Kc. Algorithms A3 and A8 are written when a SIM card is produced and cannot be read. A PIN code can be set by a subscriber on a mobile phone, a PUK code is held by an operator, and Kc is exported by Ki during an encryption process.

The SIM card is organized around a processor and includes the following memories.

(1) A read only memory (ROM). The ROM is a program memory, has typical capacity of 16 thousand (K) bytes, and includes a development system of the SIM card, and the algorithms A3 and A8 (which may also be an algorithm A38) for dedicated use.

(2) An electrically erasable programmable read only memory (EEPROM). The EEPROM is a data memory and has typical capacity of 8K bytes. The EEPROM stores all normalized domains and related data for dedicated use in a global system of mobile communication (GSM).

(3) A random access memory (RAM). The RAM is a work memory. Capacity of the RAM may further be reduced and a typical value of the capacity is hundreds of bytes. The RAM includes related data for dedicated use.

The SIM card using the EEPROM can save information that is stored when a mobile phone is powered off and retrieve the information when necessary. As long as a user keeps the SIM card properly, the same identity can still be used even when the user changes a mobile phone.

A virtual SIM card technology is a technology in which an existing hardware SIM card is directly removed. A virtual SIM card refers to a manner in which a mobile network operator does not use a SIM card to bind a mobile phone number and a mobile terminal of a subscriber, but directly provides the mobile phone number.

However, the existing virtual SIM card technology supports standby of only one of a virtual SIM card and a hardware SIM card at a same time, but cannot support simultaneous standby of both the hardware SIM card and the virtual SIM card. That is, if a mobile terminal adopts a virtual SIM card, a hardware SIM card in the mobile terminal will be disabled, and in this way, when a subscriber that uses the mobile terminal uses the virtual SIM card, the subscriber cannot use the hardware SIM card for implementing a service, and cannot be contacted based on an identifier of the hardware SIM card either, so that it is greatly inconvenient for the subscriber to use the virtual SIM card.

SUMMARY

The present disclosure provides a method and a terminal device for keeping a subscriber identity module card in a standby state, so as to implement simultaneous standby of a subscriber identity module card implemented on the basis of hardware and a subscriber identity module card implemented on the basis of software in a terminal device.

In one aspect, the present disclosure provides a method for keeping a subscriber identity module card in a standby state, which includes receiving, by a terminal device, an enabling request, where the enabling request is used for requesting simultaneous standby of a first subscriber identity module card and a second subscriber identity module card in the terminal device, the first subscriber identity module card is implemented on the basis of software, and the second subscriber identity module card is implemented on the basis of hardware, invoking, by the terminal device, a third-party invocation interface provided by an operating system of the terminal device, and performing interaction with a subscriber identity module card control module in the terminal device through a subscriber identity module mobile equipment function of the third-party invocation interface, so as to complete a network access process of the first subscriber identity module card on the basis of a data file of the first subscriber identity module card, and keeping, by the terminal device, the first subscriber identity module card and the second subscriber identity module card in a standby state at the same time according to the enabling request, where the second subscriber identity module card has already accessed a network.

In another aspect, the present disclosure provides a terminal device, which includes a first subscriber identity module card interface module and a subscriber identity module card control module, where the first subscriber identity module card interface module is configured to receive an enabling request, where the enabling request is used for requesting simultaneous standby of a first subscriber identity module card and a second subscriber identity module card in the terminal device, the first subscriber identity module card is implemented on the basis of software, and the second subscriber identity module card is implemented on the basis of hardware, invoke a third-party invocation interface provided by an operating system of the terminal device, so as to send the enabling request to the subscriber identity module card control module, and perform interaction with the subscriber identity module card control module through a subscriber identity module mobile equipment function of the third-party invocation interface, so as to complete a network access process of the first subscriber identity module card on the basis of a data file of the first subscriber identity module card, and the subscriber identity module card control module is configured to receive the enabling request sent by the first subscriber identity module card interface module, and keep the first subscriber identity module card and the second subscriber identity module card in a standby state at the same time according to the enabling request after the network access process of the first subscriber identity module card is completed, where the second subscriber identity module card has already accessed a network.

Technical effects of the present disclosure are that after receiving an enabling request for requesting simultaneous standby of a first subscriber identity module card implemented on the basis of software and a second subscriber identity module card implemented on the basis of hardware in a terminal device, the terminal device invokes a third-party invocation interface provided by an operating system of the terminal device, and performs interaction with a subscriber identity module card control module in the terminal device through a subscriber identity module mobile equipment function of the third-party invocation interface, so as to complete a network access process of the first subscriber identity module card on the basis of a data file of the first subscriber identity module card. Therefore, it can be seen that the network access process of the first subscriber identity module card is completed by interacting with the subscriber identity module card control module through the subscriber identity module mobile equipment function of the third-party invocation interface without using an interface between the second subscriber identity module card and the subscriber identity module card control module, and the network access process of the first subscriber identity module card does not influence a standby state of the second subscriber identity module card, so that the terminal device can keep the first subscriber identity module card and the second subscriber identity module card in a standby state at the same time according to the enabling request, where the second subscriber identity module card has already accessed a network, thereby implementing simultaneous standby of a subscriber identity module card implemented on the basis of hardware and a subscriber identity module card implemented on the basis of software in a terminal device. In this way, even if the terminal device uses the subscriber identity module card implemented on the basis of software, the subscriber identity module card implemented on the basis of hardware in the terminal device is kept in the standby state at the same time and is not disabled, so that a subscriber of the terminal device can still use the subscriber identity module card implemented on the basis of hardware for implementing a service, and can still be contacted through the subscriber identity module card implemented on the basis of hardware, thereby facilitating use of the subscriber.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show only some embodiments of the present disclosure, and a person of ordinary skill in the art may still derive other drawings from these accompanying drawings without creative efforts.

DETAILED DESCRIPTION

To make the objectives, technical solutions, and advantages of the embodiments of the present disclosure more comprehensible, the following clearly describes the technical solutions in the embodiments of the present disclosure with reference to the accompanying drawings in the embodiments of the present disclosure. The embodiments to be described are only a part rather than all of the embodiments of the present disclosure. All other embodiments obtained by a person of ordinary skill in the art based on the embodiments of the present disclosure without creative efforts shall fall within the protection scope of the present disclosure.

Figure 1:
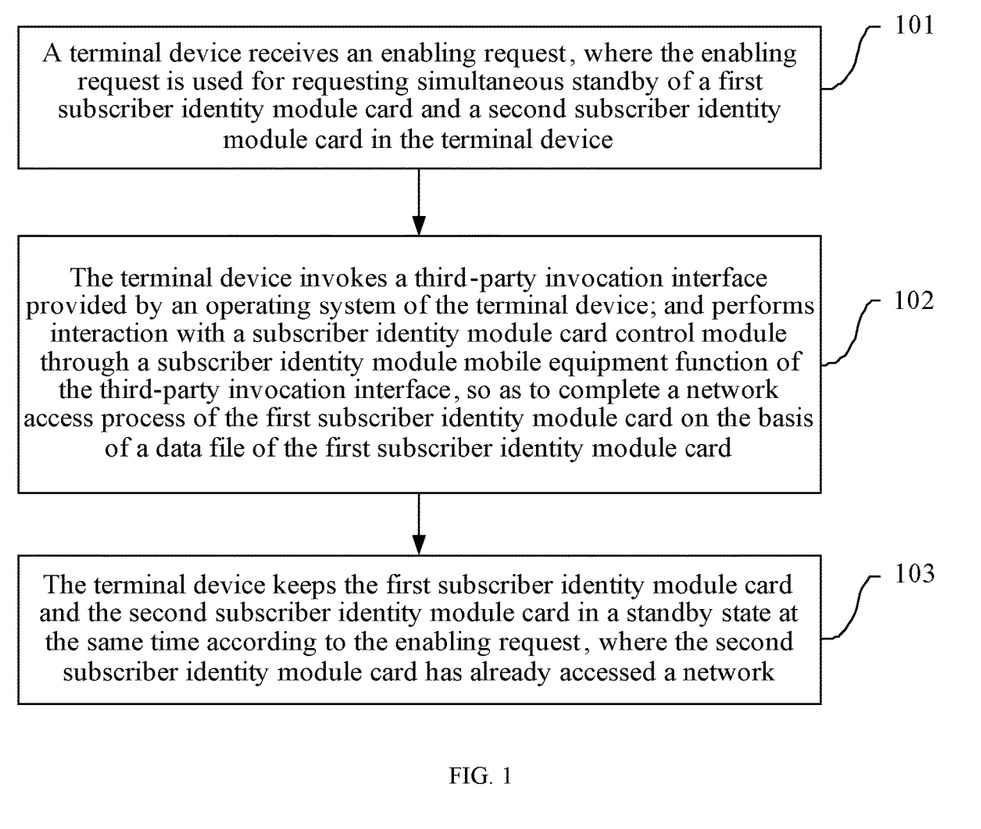
FIG. 1 is a flow chart of a method for keeping a subscriber identity module card in a standby state according to an embodiment of the present disclosure.

FIG. 1 is a flow chart of a method for keeping a subscriber identity module card in a standby state according to an embodiment of the present disclosure. As shown in FIG. 1, the method for keeping a subscriber identity module card in a standby state may include the following steps.

Step 101: A terminal device receives an enabling request, where the enabling request is used for requesting simultaneous standby of a first subscriber identity module card and a second subscriber identity module card in the terminal device, where the first subscriber identity module card is implemented on the basis of software, and the second subscriber identity module card is implemented on the basis of hardware.

That the terminal device receives an enabling request may include that the terminal device receives an enabling request for a first subscriber identity module card selected by a subscriber that uses the terminal device, where the enabling request is used for requesting simultaneous standby of a second subscriber identity module card and the first subscriber identity module card selected by the subscriber that uses the terminal device.

Step 102: The terminal device invokes a third-party invocation interface provided by an operating system of the terminal device, and performs interaction with a subscriber identity module card control module through a subscriber identity module mobile equipment function of the third-party invocation interface, so as to complete a network access process of the first subscriber identity module card on the basis of a data file of the first subscriber identity module card.

In an embodiment, the third-party invocation interface is provided by the operating system of the terminal device on the basis of a driver. That is, the operating system and the third-party invocation interface are based on a hardware driver. In an embodiment, the subscriber identity module card control module is a hardware chip, and interacts with the operating system through a driver.

The completing a network access process of the first subscriber identity module card on the basis of a data file of the first subscriber identity module card may be receiving, by the terminal device, an authentication request sent by a network side device, reading key information in the data file of the first subscriber identity module card, generating authentication information according to the read key information, and sending the authentication information to the network side device to complete the network access process of the first subscriber identity module card.

Step 103: The terminal device keeps the first subscriber identity module card and the second subscriber identity module card in a standby state at the same time according to the enabling request, where the second subscriber identity module card has already accessed a network.

Further, after the terminal device starts up and before step 103, the terminal device still needs to perform interaction with the second subscriber identity module card to complete a network access process of the second subscriber identity module card. The terminal device may receive an authentication request sent by the network side device, read key information in a data file of the second subscriber identity module card, generate authentication information according to the read key information, and send the authentication information to the network side device to complete the network access process of the second subscriber identity module card.

In this embodiment, the terminal device performs interaction with the first subscriber identity module card and the second subscriber identity module card through different interfaces, and therefore, the network access process and the standby state of the first subscriber identity module card do not influence the standby state of the second subscriber identity module card.

In this embodiment, the data file of the first subscriber identity module card is stored in the terminal device, or the data file of the first subscriber identity module card is stored in an external storage device connected to the terminal device.

In this embodiment, the data file of the first subscriber identity module card may be stored in an internal flash memory or a secure digital memory card (SD) of the terminal device, or may be stored in an external storage device connected to the terminal device. The external storage device may be connected to the terminal device in a manner such as a universal serial bus (USB), near field communication (NFC), Bluetooth®, or wireless fidelity (WiFi), and in this case, the terminal device needs to support reading of content in the data file of the first subscriber identity module card in the external storage device in a manner such as a USB, NFC, Bluetooth, or WiFi.

In this embodiment, the data file of the first subscriber identity module card is encrypted and saved. The terminal device may read the encrypted data file of the first subscriber identity module card according to a predefined rule and a predefined path, and a decryption key required for decrypting the encrypted data file of the first subscriber identity module card is provided by the network side device, so as to ensure security of information in the data file of the first subscriber identity module card.

In the foregoing embodiment, after receiving an enabling request for requesting simultaneous standby of a first subscriber identity module card implemented on the basis of software and a second subscriber identity module card implemented on the basis of hardware in a terminal device, the terminal device invokes a third-party invocation interface provided by an operating system of the terminal device, and performs interaction with a subscriber identity module card control module through a subscriber identity module mobile equipment function of the third-party invocation interface, so as to complete a network access process of the first subscriber identity module card on the basis of a data file of the first subscriber identity module card. Therefore, it can be seen that the network access process of the first subscriber identity module card is completed by interacting with the subscriber identity module card control module through the subscriber identity module mobile equipment function of the third-party invocation interface without using an interface between the second subscriber identity module card and the subscriber identity module card control module, and the network access process of the first subscriber identity module card does not influence a standby state of the second subscriber identity module card, so that the terminal device can keep the first subscriber identity module card and the second subscriber identity module card in a standby state at the same time according to the enabling request, where the second subscriber identity module card has already accessed a network, thereby implementing simultaneous standby of a subscriber identity module card implemented on the basis of hardware and a subscriber identity module card implemented on the basis of software in the terminal device. In this way, even if the terminal device uses the subscriber identity module card implemented on the basis of software, the subscriber identity module card implemented on the basis of hardware in the terminal device is kept in the standby state at the same time and is not disabled, so that a subscriber that uses the terminal device can still use the subscriber identity module card implemented on the basis of hardware for implementing a service, and can still be contacted through the subscriber identity module card implemented on the basis of hardware, thereby facilitating use of the subscriber.

The subscriber identity module card in the embodiment shown in FIG. 1 of the present disclosure may be a SIM card in a GSM system, and may also be a universal subscriber identity module (USIM) card in a universal mobile telecommunications system (UMTS), and a form of the subscriber identity module card is not limited in the present disclosure.

A person of ordinary skill in the art may understand that all or a part of the steps of the foregoing method embodiments of the present disclosure may be implemented by a program instructing relevant hardware. The program may be stored in a computer readable storage medium. When the program is run, the steps of the foregoing method embodiments are performed. The storage medium may be any medium that is capable of storing program codes, such as a ROM, a RAM, a magnetic disk, or an optical disc.

Figure 2:
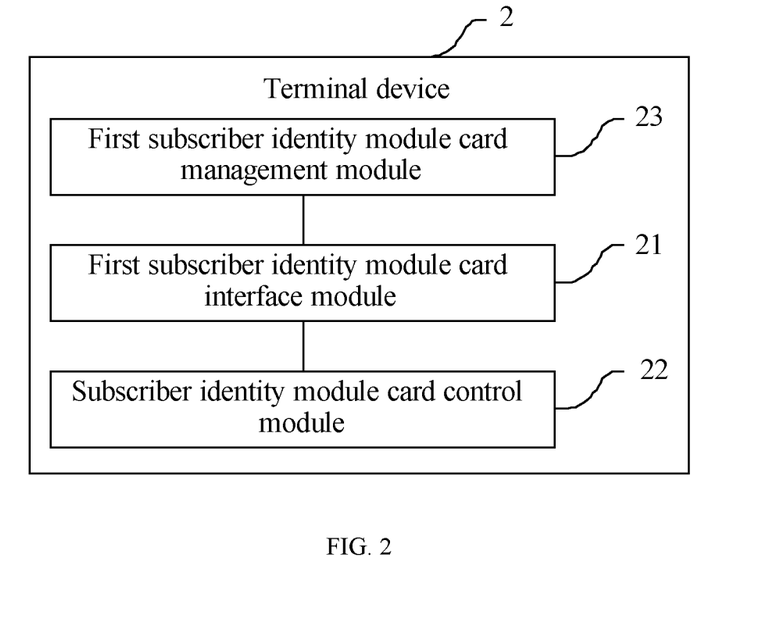
FIG. 2 is a schematic structural diagram of a terminal device according to an embodiment of the present disclosure.

FIG. 2 is a schematic structural diagram of a terminal device according to an embodiment of the present disclosure. The terminal device in this embodiment can implement a procedure of the embodiment shown in FIG. 1 of the present disclosure. As shown in FIG. 2, the terminal device 2 may include a first subscriber identity module card interface module 21 and a subscriber identity module card control module 22, where the first subscriber identity module card interface module 21 is configured to receive an enabling request, where the enabling request is used for requesting simultaneous standby of a first subscriber identity module card and a second subscriber identity module card in the terminal device, the first subscriber identity module card is implemented on the basis of software, and the second subscriber identity module card is implemented on the basis of hardware, invoke a third-party invocation interface provided by an operating system of the terminal device, so as to send the enabling request to the subscriber identity module card control module 22, and perform interaction with the subscriber identity module card control module 22 through a subscriber identity module mobile equipment function of the third-party invocation interface, so as to complete a network access process of the first subscriber identity module card on the basis of a data file of the first subscriber identity module card, and the subscriber identity module card control module 22 is configured to receive the enabling request sent by the first subscriber identity module card interface module 21, and keep the first subscriber identity module card and the second subscriber identity module card in a standby state at the same time according to the enabling request after the network access process of the first subscriber identity module card is completed, where the second subscriber identity module card has already accessed a network.

In an embodiment, the third-party invocation interface is provided by the operating system of the terminal device on the basis of a driver. That is, the operating system and the third-party invocation interface are based on a hardware driver. In an embodiment, the subscriber identity module card control module is a hardware chip, and interacts with the operating system through a driver.

In this embodiment, that the first subscriber identity module card interface module 21 is configured to perform interaction with the subscriber identity module card control module 22 through the subscriber identity module mobile equipment function of the third-party invocation interface, so as to complete the network access process of the first subscriber identity module card on the basis of the data file of the first subscriber identity module card may be that the first subscriber identity module card interface module 21 is configured to receive an authentication request from a network side device, where the authentication request is sent by the subscriber identity module card control module 22, and the authentication request is sent by the subscriber identity module card control module 22 to the first subscriber identity module card interface module 21 through the subscriber identity module mobile equipment function of the third-party invocation interface, read key information in the data file of the first subscriber identity module card, generate authentication information according to the read key information, and send the authentication information to the subscriber identity module card control module 22 through the subscriber identity module mobile equipment function of the third-party invocation interface, so that the subscriber identity module card control module 22 sends the authentication information to the network side device to complete the network access process of the first subscriber identity module card.

Further, the subscriber identity module card control module 22 is further configured to, after the terminal device starts up, perform interaction with the second subscriber identity module card to complete a network access process of the second subscriber identity module card. The subscriber identity module card control module 22 may receive an authentication request sent by the network side device, read key information in a data file of the second subscriber identity module card, generate authentication information according to the read key information, and send the authentication information to the network side device to complete the network access process of the second subscriber identity module card.

Further, the terminal device 2 may further include a first subscriber identity module card management module 23, where the first subscriber identity module card management module 23 is configured to send an enabling request for a first subscriber identity module card selected by a subscriber that uses the terminal device to the first subscriber identity module card interface module 21.

In this embodiment, that the first subscriber identity module card interface module 21 is configured to receive the enabling request may be that the first subscriber identity module card interface module 21 is configured to receive the enabling request for the first subscriber identity module card selected by the subscriber that uses the terminal device, where the enabling request is sent by the first subscriber identity module card management module 23, and the enabling request is used for requesting simultaneous standby of the second subscriber identity module card and the first subscriber identity module card selected by the subscriber that uses the terminal device.

In this embodiment, the terminal device performs interaction with the first subscriber identity module card and the second subscriber identity module card through different interfaces, and therefore, the network access process and the standby state of the first subscriber identity module card do not influence the standby state of the second subscriber identity module card.

In this embodiment, the data file of the first subscriber identity module card is stored in the terminal device, or the data file of the first subscriber identity module card is stored in an external storage device connected to the terminal device.

In this embodiment, the data file of the first subscriber identity module card may be stored in an internal flash memory or an SD card of the terminal device, or may be stored in an external storage device connected to the terminal device. The external storage device may be connected to the terminal device in a manner such as a USB, NFC, Bluetooth, or WiFi, and in this case, the first subscriber identity module card interface module 21 needs to support reading of content in the data file of the first subscriber identity module card in the external storage device in a manner such as a USB, NFC, Bluetooth, or WiFi.

In this embodiment, the data file of the first subscriber identity module card is encrypted and saved. The first subscriber identity module card interface module 21 may read the encrypted data file of the first subscriber identity module card according to a predefined rule and a predefined path, and a decryption key required for decrypting the encrypted data file of the first subscriber identity module card is provided by the network side device, so as to ensure security of information in the data file of the first subscriber identity module card.

In the foregoing terminal device, in the network access process of the first subscriber identity module card, the first subscriber identity module card interface module 21 implements interaction with the subscriber identity module card control module 22 through the subscriber identity module mobile equipment function of the third-party invocation interface without using an interface between the second subscriber identity module card and the subscriber identity module card control module 22. Therefore, the network access process of the first subscriber identity module card does not influence the standby state of the second subscriber identity module card, so that the subscriber identity module card control module 22 can keep the first subscriber identity module card and the second subscriber identity module card in the standby state at the same time according to the enabling request, where the second subscriber identity module card has already accessed the network, thereby implementing simultaneous standby of a subscriber identity module card implemented on the basis of hardware and a subscriber identity module card implemented on the basis of software in the terminal device. In this way, even if the terminal device uses the subscriber identity module card implemented on the basis of software, the subscriber identity module card implemented on the basis of hardware in the terminal device is kept in the standby state at the same time and is not disabled, so that a subscriber that uses the terminal device can still use the subscriber identity module card implemented on the basis of hardware for implementing a service, and can still be contacted through the subscriber identity module card implemented on the basis of hardware, thereby facilitating use of the subscriber.

The subscriber identity module card in the embodiment shown in FIG. 2 may be a SIM card in a GSM system, and may also be a USIM card in a UMTS system, and a form of the subscriber identity module card is not limited in the present disclosure, but in the following description of embodiments of the present disclosure, that a subscriber identity module card is a SIM card is taken as examples for description.

Figure 3:
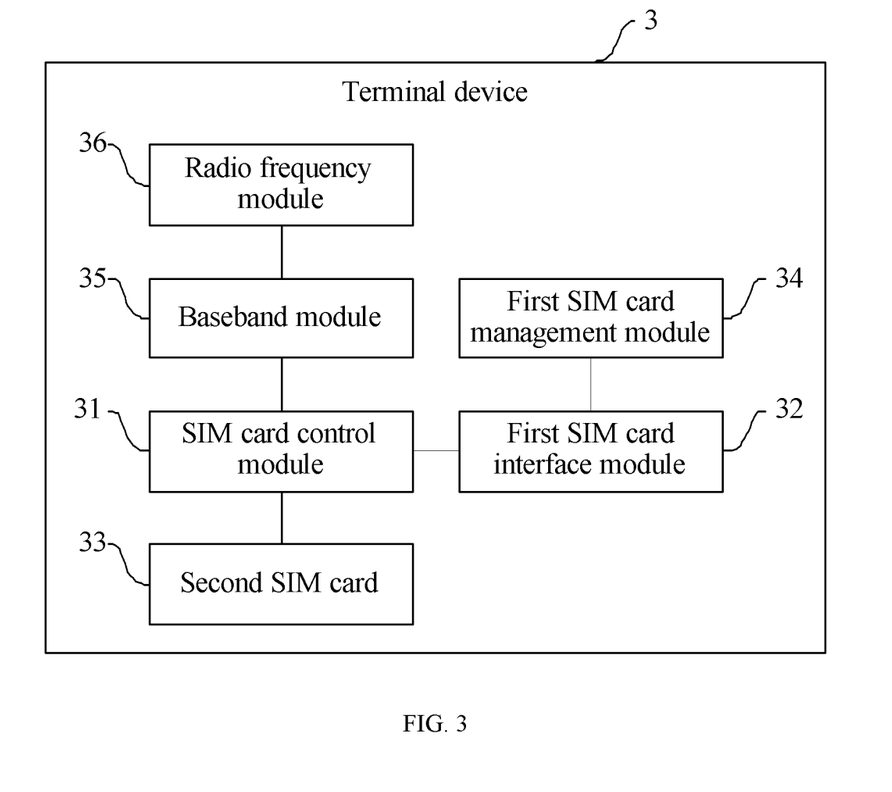
FIG. 3 is a schematic structural diagram of a terminal device according to another embodiment of the present disclosure.

FIG. 3 is a schematic structural diagram of a terminal device according to another embodiment of the present disclosure. As shown in FIG. 3, the terminal device 3 may include a SIM card control module 31, a first SIM card interface module 32, a second SIM card 33, and a first SIM card management module 34, where the second SIM card 33 is implemented on the basis of hardware and a first SIM card is implemented on the basis of software.

In addition, the terminal device 3 may further include a baseband module 35 and a radio frequency module 36.

The SIM card control module 31 is a logical function module that connects the baseband module 35 and the second SIM card 33, and in a practical application, the SIM card control module 31 and the baseband module 35 are generally integrated in a baseband chip. An interface between the SIM card control module 31 and the second SIM card 33 is a SIM mobile equipment (SIM-ME) interface. In the present disclosure, a functional interaction interface between the SIM card control module 31 and the first SIM card management module 34 and a functional interaction interface between the SIM card control module 31 and the first SIM card interface module 32 exist, so as to support simultaneous standby of the first SIM card and the second SIM card.

The first SIM card management module 34 is configured to provide a first SIM card management interface in the terminal device for a subscriber that uses the terminal device. Through the management interface, the subscriber may choose to download, enable, and/or disable the first SIM card. When the subscriber chooses to enable the first SIM card, the first SIM card management module 34 sends an enabling request for the first SIM card to the first SIM card interface module 32.

The first SIM card interface module 32 is configured to manage a data file of the first SIM card downloaded from a network side, implement an interface function with the SIM card control module 31, and implement a function such as an encryption algorithm required for invoking the interface, and is responsible for security of use of the first SIM card.

The data file of the first SIM card refers to a static data part in the first SIM card, such as a key Ki, an IMSI, and an integrated services digital network (ISDN). The data file of the first SIM card is generally encrypted and saved, and the first SIM card interface module 32 reads content of the encrypted data file of the first SIM card according to a predefined rule and a predefined path, and a decryption key required for decrypting the encrypted data file of the first subscriber identity module card is provided by a network side device, so as to ensure security of information in the data file of the first SIM card.

In this embodiment, the data file of the first SIM card may be stored in an internal flash memory or an SD card of the terminal device 3, or may be stored in an external storage device connected to the terminal device 3. The external storage device may be connected to the terminal device in a manner such as a USB, NFC, Bluetooth, or WiFi, and in this case, the first SIM card interface module 32 needs to support reading of content in the data file of the first SIM card in the external storage device in a manner such as a USB, NFC, Bluetooth, or WiFi.

In this embodiment, the first SIM card interface module 32 and the data file of the first SIM card form the first SIM card. The first SIM card interface module 32 is an application running on the terminal device and supports encryption algorithms A3 and A8, but for a third generation mobile communications system (3G) network, a function defined in a USIM such as network authentication further needs to be supported on the basis of a GSM SIM card. The data file of the first SIM card is the static data part, which includes an IMSI and/or a key, and the like.

In order to implement simultaneous standby of the first SIM card and the second SIM card, the first SIM card interface module 32 further needs to implement an interface with the first SIM card management module 34 and the interface with the SIM card control module 31, and support enabling of the first SIM card and disabling of the first SIM card, and support a first SIM card management interface, such as charging policy setting interface.

In this embodiment, the first SIM card is formed by the first SIM card interface module 32 and the data file of the first SIM card. To download the first SIM card, the two parts may be downloaded successively or may be downloaded simultaneously. When downloading the first SIM card, the subscriber may download application software of the first SIM card interface module 32 from an application store. The first SIM card interface module 32 is a basic capability of the first SIM card, and the application software of the first SIM card interface module 32 is not different for data files of first SIM cards of different operators. Therefore, when the subscriber selects a certain wireless network operator in a roaming area, the subscriber only needs to download, from the operator, a data file of a first SIM card corresponding to the operator, and choose to enable the first SIM card in the first SIM card management interface provided by the first SIM card management module 34, so as to implement a function of the first SIM card in collaboration with the first SIM card interface module 32.

In this embodiment, manners of downloading the data file of the first SIM card may include the following steps.

(1) downloading over the air (OTA), where in a manner such as two dimensional barcode scanning, a server deployed by the operator of the first SIM card is triggered to push the data file to be downloaded.

(2) in a manner such as a short message or unstructured supplementary service data (USSD), a server deployed by the operator of the first SIM card is triggered to push the data file to be downloaded, and (3) downloading by visiting a web page or through payment.

Figure 4:
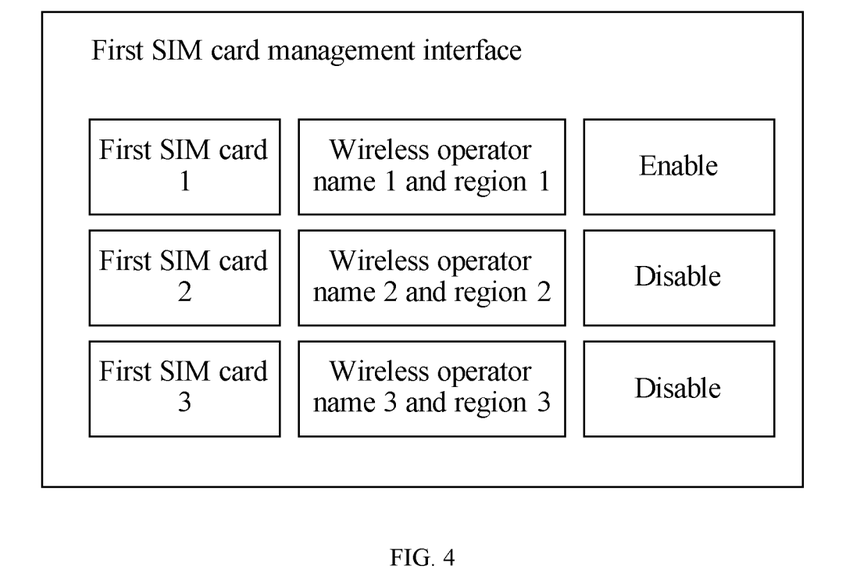
FIG. 4 is a schematic diagram of a first SIM card management interface according to an embodiment of the present disclosure.

In this embodiment, the first SIM card management interface provided by the first SIM card management module 34 may be as shown in FIG. 4. FIG. 4 is a schematic diagram of a first SIM card management interface according to an embodiment of the present disclosure.

When a subscriber of the terminal device chooses a certain first SIM card, such as a first SIM card 1 shown in FIG. 4, to be enabled, the first SIM card management module 34 sends an enabling request for the first SIM card 1 to the first SIM card interface module 32, and after enabling of the first SIM card is completed, the first SIM card interface module 32 notifies the first SIM card management module 34 that the enabling is successful.

If the subscriber of the terminal device chooses a certain first SIM card on the interface shown in FIG. 4 to be disabled, for example, if a first SIM card 2 is disabled, the first SIM card management module 34 sends a disabling request for the first SIM card 2 to the first SIM card interface module 32, to notify the first SIM card interface module 32 that the first SIM card 2 is disabled.

In specific implementation, the first SIM card interface module 32 and the first SIM card management module 34 may be implemented in one program.

In this embodiment, the first SIM card interface module 32 serves as an application program running in the operating system of the terminal device. The application software of the first SIM card interface module 32 may be downloaded from an application store, or may be downloaded from a network in another manner, and a manner for downloading the application software of the first SIM card interface module 32 is not limited in the present disclosure.

The existing SIM card control module 31 supports simultaneous standby of at least two SIM cards, where the at least two SIM cards are generally SIM cards implemented on the basis of hardware. If it is required that the SIM card control module 31 supports simultaneous standby of a SIM card implemented on the basis of software and a SIM card implemented on the basis of hardware, a problem that the SIM card control module 31 switches from a hardware interface to a software interface needs to be solved, and the software interface is provided by the first SIM card interface module 32.

Figure 5:
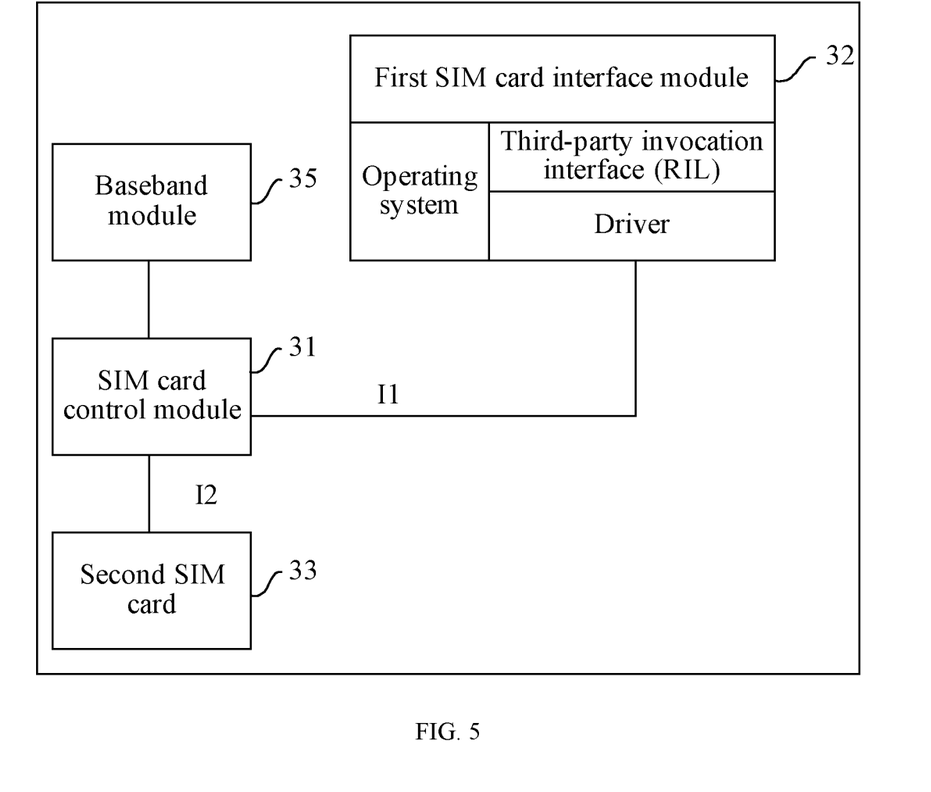
FIG. 5 is a schematic diagram of an interface between a SIM card control module and a first SIM card interface module according to an embodiment of the present disclosure.

A manner for implementing the interface between the SIM card control module 31 and the first SIM card interface module 32 may be as shown in FIG. 5. FIG. 5 is a schematic diagram of an interface between a SIM card control module and a first SIM card interface module according to an embodiment of the present disclosure.

In practical deployment, the SIM card control module 31 may be an independent chip or a function module in a chip where the baseband module 35 is located. The operating system (for example, Android®, or iOS®) of the terminal device implements communication with the SIM card control module 31 through a driver, and the operating system of the terminal device provides the third-party invocation interface, for example, a radio interface layer (ML) interface on the basis of the driver. In order to implement simultaneous standby of the first SIM card and the second SIM card, in an interface I1 shown in FIG. 5, invocation of a SIM-ME function in the ML interface needs to be implemented, and the ML interface is notified that the SIM-ME function is enabled, so that the first SIM card can be normally identified and used by the SIM card control module 31.

In this embodiment, the following functions need to be added to the ML interface.

(1) function of enabling, disabling, and/or deleting the first SIM card, and (2) SIM-ME function, including a data management interface (for example, reading and adding a contact) and subscriber identity authentication (functions such as Second Generation (2G) network access authentication, 3G network access authentication, and authentication performed by a 3G terminal device for a network).

Figure 6:
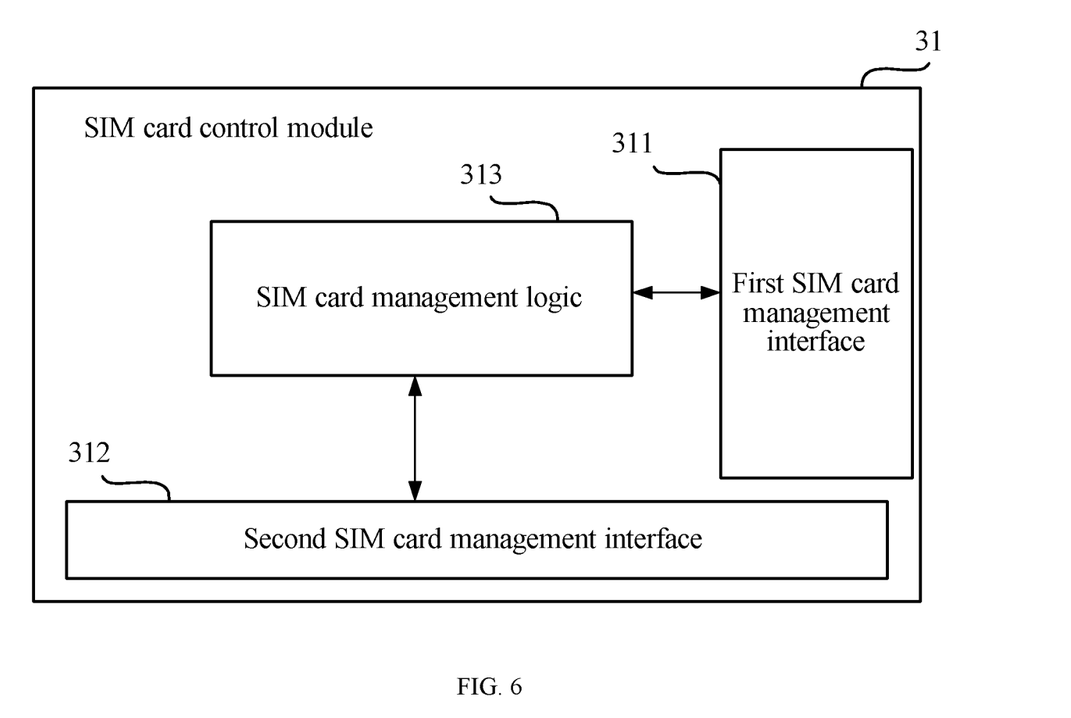
FIG. 6 is a schematic structural diagram of a SIM card control module according to an embodiment of the present disclosure.

In this embodiment, the SIM card control module 31 has a capability of simultaneously using the interface I1 and an interface I2 to invoke the first SIM card interface module 32 and the second SIM card 33, and therefore, simultaneous standby of the first SIM card and the second SIM card can be implemented. FIG. 6 is a schematic structural diagram of a SIM card control module according to an embodiment of the present disclosure.

As shown in FIG. 6, the SIM card control module 31 includes a first SIM card management interface 311 and a second SIM card management interface 312, so as to support simultaneous intercommunication with the first SIM card and the second SIM card. In addition, the SIM card control module 31 may further include a SIM card management logic 313.

If the SIM card control module 31 is integrated in the chip where the baseband module 35 is located, modifications made to the driver and the RIL interface by the operating system are modifications made to the chip where the baseband module 35 is located.

For a terminal device in which the SIM card control module 31 or the chip where the baseband module 35 is located cannot meet a new requirement, the driver is updated through the first SIM card interface module 32. In the updated driver, the SIM card management logic 313 and the second SIM card management interface 312 inside the SIM card control module 31 are hijacked, so that the SIM card management logic 313 invokes an interface in the first SIM card rather than an interface in the second SIM card, thereby implementing standby of the first SIM card. However, by adopting this solution, standby of only one SIM card (either the first SIM card or the second SIM card) can be implemented. In this scenario, choice of enabling the SIM card implemented on the basis of hardware or the SIM card implemented on the basis of software can be made in the first SIM card management interface, and a subscriber may choose to enable the SIM card implemented on the basis of software or the SIM card implemented on the basis of hardware through the first SIM card management interface. Only one of the two SIM cards can be chosen to be enabled.

The following introduces interaction processes of various modules in the embodiment shown in FIG. 3.

After a subscriber that uses the terminal device operates on the first SIM card management interface to choose to enable a specific first SIM card, for example, the first SIM card 1, the first SIM card management module 34 sends, according to the choice of the subscriber, an enabling request for the first SIM card 1 to the first SIM card interface module 32, to request simultaneous standby of the first SIM card 1 and the second SIM card. The first SIM card is implemented on the basis of software, and the second SIM card is implemented on the basis of hardware.

The first SIM card interface module 32 invokes the third-party invocation interface, for example, a ML interface, provided by the operating system of the terminal device on the basis of the driver, and sends the enabling request to the SIM card control module 31.

Then the SIM card control module 31 sends an authentication request from the network side device to the first SIM card interface module 32, where the authentication request is sent by the SIM card control module 31 to the first SIM card interface module 32 through the SIM-ME function of the third-party invocation interface, and then, the first SIM card interface module 32 reads encryption information in a data file of the first SIM card 1, generates authentication information according to the read key information, and sends the authentication information to the SIM card control module 31 through the SIM-ME function of the third-party invocation interface, so that the SIM card control module 31 sends the authentication information to the network side device to complete a network access process of the first SIM card 1.

If a network is a 3G network or a long term evolution (LTE) network, optionally, the terminal device also needs to execute an authentication process of the network, so as to ensure that the terminal device accesses a trusted network expected by the subscriber that uses the terminal device.

After the network access process of the first SIM card 1 is completed, the SIM card control module 31 keeps the first SIM card 1 in a standby state.

In addition, after the terminal device starts up, the SIM card control module 31 further performs interaction with the second SIM card 33 to complete a network access process of the second SIM card 33. The SIM card control module 31 may receive an authentication request sent by the network side device, read key information in a data file of the second SIM card 33, generate authentication information according to the read key information, and send the authentication information to the network side device to complete the network access process of the second SIM card 33.

At last, the SIM card control module 31 keeps the first SIM card 1 and the second SIM card 33 in a standby state at the same time according to the enabling request.

In addition, after simultaneous standby of the SIM card implemented on the basis of software and the SIM card implemented on the basis of hardware is implemented, it is not defined that a subscriber chooses which SIM card to initiate a service such as network access and call making, so that a SIM card of a higher priority may be chosen according to a specific policy set by a subscriber, an operator, or a terminal device. For example, if the subscriber in roaming enables a SIM card implemented on the basis of software in a roaming area, during a roaming period, the SIM card implemented on the basis of software is preferentially used for a service initiated by the subscriber, so as to reduce roaming fees of the subscriber.

With the method and the terminal device for keeping a subscriber identity module card in a standby state provided in the present disclosure, simultaneous standby of a SIM card implemented on the basis of hardware and a SIM card implemented on the basis of software in a terminal device can be implemented, so that a subscriber can conveniently choose an appropriate SIM card to initiate a service when roaming, thereby effectively solving a problem of SIM card use when the subscriber is roaming, and reducing a production cost of a SIM card, so that, the SIM card implemented on the basis of software is applied efficiently.

A person skilled in the art may understand that the accompanying drawings are only schematic diagrams of an exemplary embodiment, and the modules or procedures in the accompanying drawings are not necessarily indispensable in implementing the present disclosure.

A person skilled in the art may understand that the modules in the apparatus provided in the embodiments may be arranged in the apparatus in a distributed manner according to the description of the embodiments, or may be changed and arranged in one or a plurality of apparatuses that are different from those described in the embodiments. The modules in the foregoing embodiments may be combined into one module, or may be split into a plurality of sub-modules.

Finally, it should be noted that the foregoing embodiments are only intended for describing the technical solutions of the present disclosure rather than limiting the present disclosure. Although the present disclosure is described in detail with reference to the foregoing embodiments, a person of ordinary skill in the art should understand that modifications may still be made to the technical solutions described in the foregoing embodiments, or equivalent replacements may still be made to some or all of the technical features thereof, however, these modifications or replacements do not make the essence of corresponding technical solutions depart from the scope of the technical solutions in the embodiments of the present disclosure.

The invention claimed is:

1. A method for keeping a first subscriber identity module (SIM) card and a second SIM card in a standby state, implemented by a terminal device, and comprising:
   accessing a second network for the second SIM card using a second interface, wherein the second SIM card is implemented based on hardware;
   receiving an enabling request, wherein the enabling request is configured for standby of the first SIM card in the terminal device, and wherein the first SIM card is implemented based on software;

invoking a third-party interface for performing a first network access process of the first SIM card based on a first data file associated with the first SIM card, wherein the third-party interface is different from the second interface; and keeping the first SIM card and the second SIM card in simultaneous dual standby.

2. The method of claim 1, wherein accessing the second network comprises:

receiving an authentication request from a network side device;

reading key information in a second data file associated with the second SIM card;

generating authentication information according to the key information; and sending the authentication information to the network side device to complete accessing the second network for the second SIM card.

3. The method of claim 1, wherein the first data file is stored in the terminal device or an external storage device connected to the terminal device.

4. The method of claim 1, wherein the first data file is encrypted and saved, and wherein the method further comprises receiving a decryption key required for decrypting the first data file from a network side device.

5. The method of claim 1, further comprising displaying a user interface of an application in order to manage the first SIM card.

6. The method of claim 5, further comprising downloading the application from an application store.

7. The method of claim 5, further comprising using the application to enable or disable the first SIM card.

8. The method of claim 1, further comprising downloading the first data file over the air (OTA), through a short message or unstructured supplementary service data, and by visiting a web page or submitting a payment.

9. The method of claim 1, wherein the third-party interface is an interface of an operating system.

10. The method of claim 1, wherein invoking the third-party interface comprises invoking the third-party interface through a subscriber identity module mobile equipment (SIM-ME) function of the third-party interface.

11. A terminal device comprising:

a processor configured to execute program codes to cause the terminal device to:

access a second network for a second subscriber identity module (SIM) card using a second interface, wherein the second SIM card is implemented based on hardware;

receive an enabling request, wherein the enabling request is configured for standby of a first SIM card in the terminal device, and wherein the first SIM card is implemented based on software;

invoke a third-party interface for performing a first network access process of the first SIM card based on a first data file associated with the first SIM card, wherein the third-party interface is different from the second interface; and keep the first SIM card and the second SIM card in simultaneous dual standby.

12. The terminal device of claim 11, wherein the processor is further configured to execute the program codes to cause the terminal device to:

receive an authentication request from a network side device;

read key information in a second data file associated with the second SIM card;

generate authentication information according to the key information; and send the authentication information to the network side device to complete accessing the second network for the second SIM card.

13. The terminal device of claim 11, wherein the first data file is stored in the terminal device or an external storage device connected to the terminal device.

14. The terminal device of claim 11, wherein the first data file is encrypted and saved, and wherein the processor is further configured to execute the program codes to cause the terminal device to receive a decryption key required for decrypting the first data file from a network side device.

15. The terminal device of claim 11, wherein the processor is further configured to execute the program codes to cause the terminal device to display a user interface provided by an of an application in order to manage the first SIM card.

16. The terminal device of claim 15, wherein the processor is further configured to execute the program codes to cause the terminal device to download the application from an application store.

17. The terminal device of claim 15, wherein the processor is further configured to execute the program codes to cause the terminal device to use the application to enable or disable the first SIM card.

18. The terminal device of claim 11, wherein the processor is further configured to execute the program codes to cause the terminal device to download the first data file over the air (OTA), through a short message or unstructured supplementary service data, and by visiting a web page or submitting a payment.

19. The terminal device of claim 11, wherein the third-party interface is an interface of an operating system.

20. The terminal device of claim 11, wherein the program codes further cause the terminal device to invoke the third-party interface through a subscriber identity module mobile equipment (SIM-ME) function of the third-party interface.

21. A non-transitory computer medium configured to store instructions that, when executed by a processor of a terminal device, cause the terminal device to:

access a second network for a second subscriber identity module (SIM) card using a second interface, wherein the second SIM card is implemented based on hardware;

receive an enabling request, wherein the enabling request is configured for standby of a first SIM card in the terminal device, and wherein the first SIM card is implemented based on software;

invoke a third-party interface for performing a first network access process of the first SIM card based on a first data file associated with the first SIM card, wherein the third-party interface is different from the second interface; and keep the first SIM card and the second SIM card in simultaneous dual standby.

* * * * *

UNITED STATES PATENT AND TRADEMARK OFFICE
CERTIFICATE OF CORRECTION

| | | |
|---|---|---|
| PATENT NO. | : 12,028,934 B2 | Page 1 of 1 |
| APPLICATION NO. | : 17/490159 | |
| DATED | : July 2, 2024 | |
| INVENTOR(S) | : Zhidong Bai et al. | |

It is certified that error appears in the above-identified patent and that said Letters Patent is hereby corrected as shown below:

In the Claims

Claim 15, Column 16, Lines 21-22: "interface provided by an of an application" should read "interface of an application"

Signed and Sealed this
Sixth Day of August, 2024

Katherine Kelly Vidal
*Director of the United States Patent and Trademark Office*